United States Patent
Ries-Mueller et al.

(10) Patent No.: US 7,174,245 B2
(45) Date of Patent: Feb. 6, 2007

(54) METHOD AND SYSTEM FOR IDENTIFYING THE DEGREE OF A SLIP OF A BELT PART OF A BELT TRANSMISSION

(75) Inventors: Klaus Ries-Mueller, Bad Rappenau (DE); Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,541

(22) PCT Filed: May 28, 2002

(86) PCT No.: PCT/DE02/01954

§ 371 (c)(1), (2), (4) Date: Apr. 18, 2003

(87) PCT Pub. No.: WO03/001087

PCT Pub. Date: Jan. 3, 2003

(65) Prior Publication Data
US 2003/0167115 A1   Sep. 4, 2003

(30) Foreign Application Priority Data
Jun. 22, 2001 (DE) ............................... 101 30 231

(51) Int. Cl.
G06F 7/00 (2006.01)
G06F 17/00 (2006.01)

(52) U.S. Cl. ............................................. 701/51; 477/45
(58) Field of Classification Search ............ 701/51–52; 477/44, 46, 49, 68
See application file for complete search history.

(56) References Cited

U.S. PATENT DOCUMENTS

| | | | |
|---|---|---|---|
| 6,099,424 A | 8/2000 | Tsai et al. | |
| 6,146,294 A * | 11/2000 | Bolz | 474/8 |
| 6,321,613 B1* | 11/2001 | Avidor | 74/348 |
| 6,409,627 B2* | 6/2002 | Bolz et al. | 477/46 |
| 6,547,692 B1 | 4/2003 | Ries-Mueller et al. | |
| 2001/0049315 A1* | 12/2001 | Tsutsui | 477/44 |

FOREIGN PATENT DOCUMENTS

DE   100 28 459       12/2000
JP   404331853 A   *  11/1992

* cited by examiner

Primary Examiner—Gertrude A. Jeanglaude
(74) Attorney, Agent, or Firm—Walter Ottesen

(57) ABSTRACT

The present invention relates to a method for detecting a slip (s) of a belt part of a belt transmission, especially of a CVT transmission, having a transmission rpm ratio (ji).

According to the invention, a slip of the belt part is detected by evaluating the change of the transmission rpm ratio (ji).

50 Claims, 4 Drawing Sheets

METHOD AND SYSTEM FOR IDENTIFYING THE DEGREE OF A SLIP OF A BELT PART OF A BELT TRANSMISSION

This application is the national state of PCT/DE02/01954, filed on May 28, 2002. designating the U.S.

FIELD OF THE INVENTION

The invention relates to a method for detecting a slip of a belt part of a belt transmission, especially of a CVT transmission. The belt transmission has a transmission rpm ratio.

The invention relates further to a system for detecting a slip of a belt part of a belt transmission, especially of a CVT transmission, having a transmission rpm ratio.

BACKGROUND OF THE INVENTION

In belt transmissions, it is problematic when the belt part, which transmits torques between two rotating elements, has slippage, that is, the belt part moves without grasping. In this case, considerable damage can occur to the belt transmission, especially, considerable wear of the belt part can occur. At times, the transmission can be destroyed when a slippage of the belt part occurs which is too great.

The above problem is especially relevant for CVT transmissions. CVT transmissions are continuously operating transmissions (CVT=continuously variable transmission). The CVT transmission includes essentially two conical wheel pairs and a belt part designed, for example, as a thrust member band. One of the conical wheel pairs is connected to a drive, for example. of an internal combustion engine while the other conical wheel pair is connected to an output. To adjust the transmission ratio of a CVT transmission and the tension of the belt part, the drive conical wheel pair and the output conical wheel pair essentially include each an axially fixed and an axially movable conical wheel. The drive conical wheel pair is characterized also as a drive disc or primary disc. The output conical wheel pair is also characterized as an output disc or a secondary disc. The pressing of the axially movable conical wheels against the belt part takes place, in general, via a build up of hydraulic pressure, for example, via a pump. The desired transmission ratio of the CVT transmission and the required tension of the belt part can be adjusted with a suitable selection of the contact pressures. The pump for the hydraulic drive of the conical wheels can, for example, be driven by the internal combustion engine. For example, a torque converter and a planetary set with clutches for forward and rearward travel can be provided for the force transmission from the internal combustion engine to the drive conical wheel pair. By increasing the contact pressure, a slippage of the belt part can, as a rule, be avoided; however, an increased contact pressure leads to an unwanted increase of the losses, for example, pump losses. The control (open loop and/or closed loop) of the pressing force must therefore find an optimum between minimal pressure losses on the one hand and the slippage which is to be avoided on the other hand. In this connection, it is already known to build up a pressure reserve in order to avoid slippage of the belt part, which, for example, can be caused by the dynamic and disturbance in-couplings which are dependent upon the roadway characteristics. In each case, it is necessary to timely detect a slippage to be able to avoid an unwanted occurrence of a slippage of the belt part.

SUMMARY OF THE INVENTION

The method, in accordance with the class, of detecting a slippage of the belt part builds upon the state of the art in accordance with the class in that a slippage of the belt part is detected from the evaluation of the change of the transmission rpm ratio. The transmission rpm ratio can be determined via a quotient of the primary rpm (for example, of a drive conical wheel pair) and a secondary rpm, for example, the rpm of an output conical wheel pair. The primary rpm and the secondary rpm are anyway detected in belt transmissions so that no additional hardware is required with respect thereto. With the solution of the invention, countermeasures can be initiated, for example, already with the first detection of a slip before a destruction of the belt part (for example, of a thrust member band) or an increased wear occurs.

In the method of the invention, it is furthermore preferably provided that the evaluation of the transmission rpm ratio includes distinguishing between relatively slow changes of the transmission rpm ratio and relatively rapid changes of the transmission rpm ratio. In this way, it can be distinguished between usual transmission ratio changes, for example, because of a wanted transmission ratio shift, and transmission ratio changes which are based on a slippage of the belt part. Transmission ratio changes because of a slippage lead to considerably more rapid transmission ratio changes than transmission ratio changes caused, for example, by a shift of the conical discs. Because of this relationship, it is advantageous to apply only relatively rapid changes of the transmission rpm ratio to determine the slippage.

In advantageous embodiments of the method of the invention, it is further provided that countermeasures are initiated with the detection of a slippage.

In this context, it can be provided in the method of the invention, for example, that the belt part runs with an adjustable contact pressure about two conical wheel pairs (as was already explained initially herein in connection with CVT transmissions) and that the countermeasures include an increase of the contact pressure. An increase of this kind of the contact pressure is, preferably, provided only for short time intervals, that is, this increase is continuously checked as to its continued necessity in order to hold the losses mentioned initially herein as low as possible.

The method of the invention can include embodiments wherein it is provided that a conclusion is drawn as to the state of wear of the belt part from the detected slip. The detected slip can then, for example, be included in the estimate of the deterioration or of the wear of the thrust member band as explained in Offenlegungsschrift DE 100 28 459 A1. According to the teaching of this publication, a deterioration value of the thrust member band is, for example, determined which, inter alia, is dependent upon the operating time duration of the thrust member band. Further variables, which influence the deterioration value, are, for example, the driving performance and the operating conditions under which the thrust member band has been operated. For example, it is possible to determine a safety reserve for the tension or the contact pressure of the thrust member band in dependence upon such a deterioration value.

Especially in the presently explained relationship, it can be provided in the method of the invention that the belt part runs about the conical wheel pairs with an adjustable contact pressure and that the contact pressure is adjusted in dependence upon the wear state of the belt part. In this case too, the contact pressure is, however, increased preferably only by degrees and only in order to not unnecessarily increase the losses of the transmission.

In a preferred embodiment of the method of the invention, it is provided that the slippage is defined as follows:

$$s=1-(ig/ji),$$

wherein: s is the slippage; ig is a geometric transmission ratio; and, ji is the transmission rpm ratio. The geometric transmission ratio can be adjusted in a CVT transmission with a shift of the conical discs. The detection of the geometric transmission can, for example, take place with a path sensor or via a distance measurement.

Especially in this connection, it can be provided in preferred embodiments of the method of the invention that the geometric transmission ratio is assumed to have a constant value. This assumption applies in approximation for a short time region or for a short time duration. When the slip is determined with the above-explained formula, the slip is dependent exclusively on the transmission rpm ratio for a constant geometric transmission ratio. Stated otherwise, a change of the slip in this case is proportional to a change of the transmission rpm ratio.

In the method of the invention, it can furthermore be provided that the geometric transmission ratio is set to the maximum value of the geometric transmission ratio when the state of "maximum transmission ratio" is detected. In this embodiment of the invention, the situation is applied for the determination of the geometric transmission ratio that the geometric transmission is generally known in the end positions of the conical discs. This means that the geometric transmission ratio is known because of constructional data for minimum and maximum transmission ratios. The detection of the maximum transmission ratio can, for example, take place by the system of the invention based on the transmission ratio control.

From the above, it results that the method of the invention can likewise provide that the geometric transmission ratio is set to the minimum value of the geometric transmission ratio when the state "minimum transmission ratio" is detected.

Especially in this connection, the method of the invention can furthermore provide that the slip detection takes place essentially only in the state "maximum transmission ratio".

In a similar manner, the method of the invention can additionally or alternatively provide that the slip detection takes place essentially only in the state "minimum transmission ratio".

Especially when the geometric transmission ratio is assumed as a constant value, it is preferably furthermore provided in the method of the invention that a slip change is determined as follows:

$$ds(n)=([ji(n+1)-ji(n)]-K)/N,$$

wherein ds is the slip change; n is an index or a computing raster; ji is the transmission rpm ratio; K is a compensation term; and, N is a normalized term. The slip change can be compared to a threshold value in an advantageous manner to detect a slippage. This threshold value is preferably applied in dependence upon the operating point; for example, the load, the engine torque, the engine rpm and the transmission ratio can be considered.

In advantageous embodiments of the method of the invention, it is furthermore provided in this connection that the compensation term is provided for compensating relatively slow changes of the transmission rpm ratio. The relatively slow changes of the transmission rpm ratio are, as a rule, based on wanted shifts of the transmission ratio and are therefore of subordinate significance for a detection of the slip.

In this connection, it can be furthermore provided in the method of the invention that the compensation term is determined via a median value formation. In contrast to the formation of an arithmetic mean value, there is no summation of several values and a division by the number of values in the formation of a median value; instead, the values are arranged in accordance with magnitude and the mean value, referred to this order, defines the median value. It has been shown that a median value formation is excellently suited to practically completely compensate effects of accelerations and decelerations for a larger class than the linear class.

Additionally or alternatively, it can be provided by the method of the invention that the compensation term is determined via a mean value formation. A mean value formation of this kind can, for example, be the formation of an arithmetic mean value.

Especially in the above-explained relationship, it can be provided in the method of the invention, for example, that the compensation term is determined as follows:

$$K=[ji(n+4)-ji(n-4)]/8,$$

wherein: K is the compensation term; ji is the transmission rpm ratio; and, n is an index or a computation raster. It is understood that also other embodiments are conceivable wherein another number than 8 computer rasters are considered.

In the method of the invention, it can furthermore be provided that the normalization term is provided to adapt the slip change to various rpm ranges.

Especially in this context, it can be provided with the method of the invention, for example, that the normalization term is determined as follows:

$$N=[ji(n)]^3,$$

wherein: N is the normalization term; ji is the transmission rpm ratio; and, n is an index or a computation raster.

Each arrangement, which is suitable for executing an embodiment of the method of the invention, falls in the scope of the present invention.

The system according to class for detecting a slip of the belt part builds upon the state of the art according to the class in that the system detects a slip of the belt part via the evaluation of the change of the transmission rpm ratio. The transmission rpm ratio can be determined, similarly to the method of the invention, via a quotient of the primary rpm (for example, a drive conical wheel pair) and a secondary rpm (for example, the rpm of an output conical wheel pair). As mentioned, the primary rpm and the secondary rpm in standard belt transmissions are anyway detected so that no additional hardware complexity is required with respect thereto. Also with the system of the invention, countermeasures can be initiated, for example, already with the first detection of a slip before a destruction of the belt part occurs, for example, of a thrust member band, or increased wear occurs.

As in the method of the invention, it is also preferably furthermore provided in the system of the invention that the system distinguishes between relatively slow changes of the transmission rpm ratio and relatively rapid changes of the transmission rpm ratio when evaluating the transmission rpm ratio. In this way, and as already mentioned, one can distinguish between conventional transmission ratio changes, for example, because of a wanted transmission ratio shift, and transmission ratio changes which are caused by a slippage of the belt part. As already mentioned in connection with the method of the invention, transmission ratio changes because of a slip lead to considerably more rapid transmission ratio changes than transmission ratio changes caused, for example, by a shift of the conical discs. Because of this relationship, it is advantageous in the system of the invention to apply only relatively rapid changes of the transmission rpm ratio for the determination of the slippage.

In advantageous further embodiments of the system of the invention, it is provided that the system initiates countermeasures with the detection of a slippage.

In this connection, it can also be provided in the system of the invention for example that the belt part runs over two conical wheel pairs with an adjustable contact pressure (as was already explained initially in connection with CVT transmissions) and that the countermeasures include an increase of the contact pressure. An increase of this kind of the contact pressure is, as already explained in connection with the method of the invention, preferably only for short time segments or is continuously checked as to its continuing necessity in order to hold the losses, mentioned initially herein, as low as possible.

The system of the invention can include embodiments wherein it is provided that the system draws a conclusion as to the state of wear of the belt part from the detected slip. The detected slip can, for example, be included in the estimation of the deterioration or wear of the thrust member band as explained in the already mentioned Offenlegungsschrift DE 100 28 459 A1. According to the teaching of this publication, as mentioned, for example, a deterioration value of the thrust member band is determined which, inter alia, is dependent upon the duration of operating time of the thrust member band. Additional variables which influence the deterioration value are, for example, the driving performance and the operating conditions under which the thrust member band has been operated. Also in connection with the system of the invention, it is, for example, possible to determine a safety reserve for the tension or the contact pressure of the thrust member band in dependence upon a deterioration value of this kind.

Especially in the presently explained connection, it can be provided in the system of the invention that the belt part runs over the conical wheel pairs at an adjustable contact pressure and that the system adjusts the contact pressure in dependence upon the state of wear of the belt part in a manner similar as in the method of the invention. With the system of the invention, the contact pressure is also preferably increased by degree in order to not unnecessarily increase the losses of the transmission.

Also in a preferred embodiment of the system of the invention, it is provided that the slip is defined as follows:

$$s=1-(ig/ji),$$

wherein: s is the slippage; ig is a geometric transmission ratio; and, ji is the transmission rpm ratio. In a CVT transmission, the geometric transmission ratio can, as mentioned, be adjusted by a shifting of the conical discs. The detection of the geometric transmission ratio can, for example, take place with a path sensor or via a distance measurement as was explained already in connection with the method of the invention.

Especially in this context, it can be provided also in a preferred embodiment of the system of the invention that the system assumes the geometric transmission ratio as a constant value. This assumption applies, as mentioned, approximately for a short time interval or for a short time duration. When the slip is determined by the above explained formula, the slip is dependent exclusively on the transmission rpm ratio for a constant geometric transmission ratio similarly as in the case of the method of the invention. Stated otherwise, a change of the slip in this case is proportional to a change of the transmission rpm ratio.

In the system according to the invention, it can further be provided that the geometric transmission ratio is set to the maximum value of the geometric transmission ratio when the state "maximum transmission ratio" is detected. In this embodiment of the invention, the situation is applied for the determination of the geometric transmission ratio that the geometric transmission ratio is, in general, known in the end positions of the conical discs. This means that the geometric transmission ratio is known because of constructive data for minimum and maximum transmission ratios. The detection of the maximum transmission ratio can, for example, take place by the system of the invention with the transmission control.

From the above, it results that the system of the invention can likewise provide that the geometric transmission ratio is set to the minimum value of the geometric transmission ratio when the state "minimum transmission ratio" is detected.

Especially in this connection, the system of the invention can further provide that the slip detection takes place essentially only in the state "maximum transmission ratio".

In the same way, the system of the invention can additionally or alternatively provide that the slip detection takes place essentially only in the state "minimum transmission ratio".

Especially when the geometric transmission ratio is assumed as a constant value, it is also further provided in the system of the invention that the system determines a slip change as follows:

$$ds(n)=([ji(n+1)-ji(n)]-K)/N,$$

wherein: ds is the slip change; n is an index or a computation raster; ji is the transmission rpm ratio; K is a compensation term; and, N is a normalization term. The slip change can also be advantageously compared to a threshold value in the system of the invention for detecting a slip. This threshold value is preferably again applied in dependence upon operating point and, for example, the load, the engine torque, the engine rpm and the transmission ratio can be considered.

Also in advantageous further embodiments of the system of the invention it is further provided in this connection that the system uses the compensation term to compensate for relatively slow changes of the transmission rpm ratio. The relatively slow changes of the transmission ratio are, as a rule, based on wanted shifts of the transmission ratio and are therefore of a subordinate significance for a detection of a slip as explained already in connection with the method of the invention.

In this context, it can also be provided with the system of the invention that the system determines the compensation term via a median value formation. In contrast to the formation of an arithmetic mean value, in the formation of a median value no summation of several values and a division by the number of the values takes place; instead, the values are arranged in the order of magnitude and the average value referred to this order defines the median value as already explained in connection with the method of the invention. As mentioned, it has been shown that a median value formation is very well suited to practically completely compensate effects of accelerations and decelerations for a larger class than the linear class.

Additionally or alternatively, it can be provided with the system of the invention that the system determines the compensation term via a mean value formation. In a mean value formation of this kind, this can be, for example, the formation of an arithmetic mean value as in the method according to the invention.

Especially in the connection explained above, it can also be provided in the system of the invention, for example, that the system determines the compensation term as follows:

$$K=[ji(n+4)-ji(n-4)]/8,$$

wherein: K is the compensation term; ji is the transmission rpm ratio; and, n is an index or a computing raster. It is understood that also in the system of the invention, embodiments are conceivable wherein another number than 8 computing rasters is considered.

In the system of the invention, it can further be provided that the system uses the normalization term to adapt the slip change to different rpm ranges similarly as in the method of the invention.

Especially in this connection, it can be also provided in the system of the invention, for example, that the system determines the normalization term as follows:

$$N=[ji(n)]^3,$$

wherein: N is the normalization term; ji is the transmission rpm; and, n is an index or a computing raster.

BRIEF DESCRIPTION OF THE DRAWINGS

The invention will now be explained in greater detail with reference to the drawings wherein.

DESCRIPTION OF THE EMBODIMENTS

Figure 1:
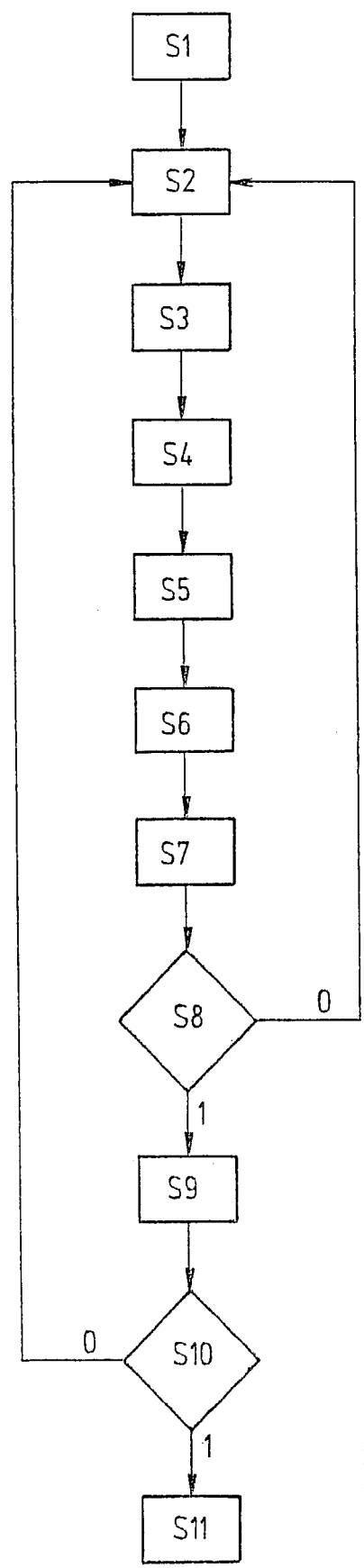
FIG. 1 is a flow diagram which shows the execution of an embodiment of the method of the invention.

FIG. 1 shows a flow diagram which explains the execution of an embodiment of the method of the invention. The significance of the steps S1 to S11, which are shown in FIG. 1, will be evident from the following table.

| Step | Explanation |
| --- | --- |
| S1 | Start |
| S2 | detect primary rpm (npm) |
| S3 | detect secondary rpm (nse) |
| S4 | compute transmission rpm ratio (ji) |
| S5 | determine compensation term (K) |
| S6 | determine normalization term (N) |
| S7 | determine slip change ds (n) |
| S8 | slip change ds (n) $\geq$ threshold value SW? |
| S9 | initiate countermeasures |
| S10 | End? |
| S11 | End |

The embodiment of the method of the invention shown in FIG. 1 starts with step S1.

In step S2, the primary rpm npm is detected. For this purpose, the rpm sensor, which is identified in FIG. 2 by 20, can, for example, be used. The sensor supplies a signal for the rpm of a drive or primary conical wheel pair 30.

At step S3, the secondary rpm nse is detected. For this purpose, the rpm sensor, which is identified in FIG. 2 with 22, can, for example, be used. This sensor detects the rpm of an output or secondary wheel pair 32.

At step S4, the transmission rpm ratio ji is determined in that the quotient npm/nse is formed from the primary rpm npm, which is detected in step S2, and the secondary rpm nse, which is detected in step S3.

In step S5, the compensation term K is determined. This compensation term K is, in this embodiment, provided to compensate relatively slow changes of the transmission ratio ji. Even though for specific embodiments of the method of the invention, a median value formation can be used for determining the compensation term, the compensation term K is determined in the illustrated embodiment as follows:

$$K=[ji(n+4)-ji(n-4)]/8,$$

wherein: K is the compensation term; ji is the transmission rpm ratio; and, n is an index or a computing raster.

In step S6, the normalization term N is determined. The normalization term N serves for adapting the slip change to various rpm ranges and is determined as follows:

$$N=[ji(n)]^3,$$

wherein: N is the normalization term; ji is the transmission rpm ratio; and, n is an index or a computation raster.

In step S7, the slip change ds(n) is determined in accordance with the formula:

$$ds(n)=([ji(n+1)-ji(n)]-K)/N,$$

wherein: ds is the slip change; n is an index or a computation raster; ji is the transmission rpm ratio; K is a compensation term; and, N is a normalization term.

In step S8, a check is made as to whether the slip change ds(n)$\geq$a predetermined threshold value SW, which slip change was determined in step S7. The threshold value SW is applied in dependence upon operating point and in dependence upon the load, the engine torque, the engine rpm and the transmission ratio. Insofar as the slip change ds(n) is not $\geq$ the threshold value SW, there is a branching back to step S2 because no slip was detected. When the slip change ds(n)$\geq$the threshold value SW, a slip is detected and there is a branching to step S9.

In step S9, suitable countermeasures are initiated. For example, when the belt transmission is defined by the CVT transmission 10 shown in FIG. 2 wherein a belt part 34 runs with an adjustable contact pressure about two conical wheel pairs (30, 32), the countermeasures can detect an increase of the contact pressure.

In step S10, a check is made as to whether the slip detection of the invention should be continued. If this is the case, then there is a branching back to step S2 and the method sequence is executed anew. Insofar as no renewed execution of the method is wanted, there is a branching to step S11 where the method is ended.

Figure 2:
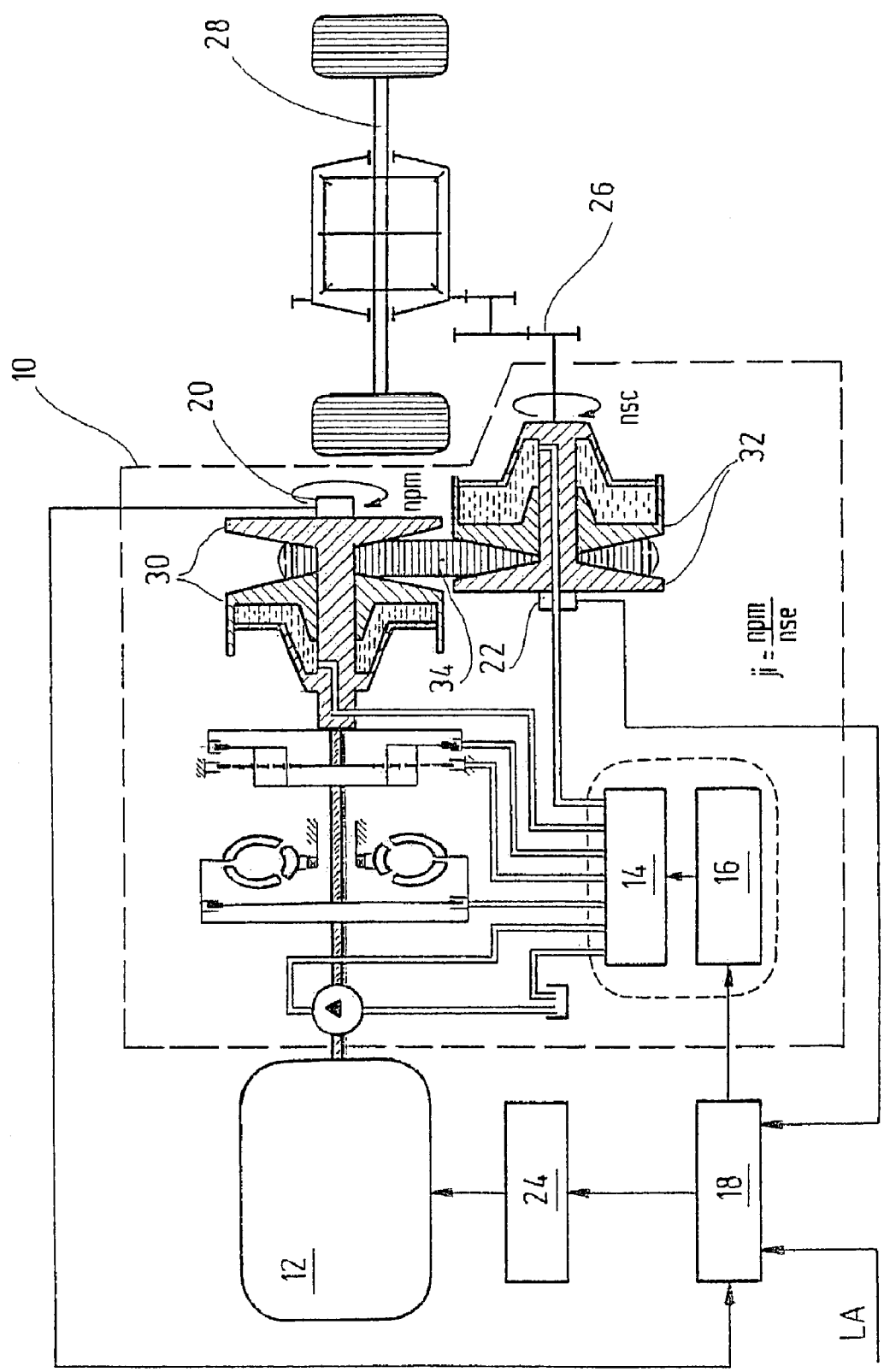
FIG. 2 is a schematic representation which shows the interrelationship of the system of the invention with a CVT transmission.

FIG. 2 shows a schematic illustration which explains the interrelationship of the system of the invention with a CVT transmission. According to the illustration of FIG. 2, the CVT transmission, which is identified in total by 10, has two conical wheel pairs (30, 32). The conical wheel pair 30 is connected to a drive which, in the illustrated case, is defined by an internal combustion engine 12. The conical wheel pair 30 is therefore identified as drive or primary conical wheel pair 30. The other conical wheel pair 32 is connected to an output 26, which in the illustrated case, is connected to a driven axle 28 of a motor vehicle in a manner known per se. The conical wheel pair 32 is therefore characterized as output or secondary wheel pair 32. The belt part, which surrounds both conical wheel pairs (30, 32), is shown in the form of a thrust member band 34. For adjusting the transmission ratio of primary rpm npm to output rpm nse (and for adjusting the tension of the thrust member band 34), each conical wheel pair (30, 32) has an axially fixed and an axially movable conical wheel. A hydraulic 14, which is driven by a hydraulic drive 16, is used for the purpose to press the axially movable conical wheels with a suitable contact pressure in the direction toward the axially fixed conical wheels and thereby to vary the transmission ratio. In the embodiment shown in FIG. 2, the primary rpm is detected by a primary rpm sensor 20 which supplies a primary rpm signal to the system 18 of the invention which can be part of a motor control (open loop and/or closed loop). Correspondingly, a secondary rpm sensor 22 is provided which supplies a secondary rpm signal to the system 18 of the invention. In the illustrated case, the system 18 is further connected to actuating members 24 which are of no particular interest here. These actuating members 24 are assigned to the drive motor 12. Furthermore, a signal LA is supplied to the system 18, which in the illustrated case, indicates the power request of the driver. The system 18 indicated in FIG. 2 detects a slip of the belt part 34 via the evaluation of the change of the transmission rpm ratio ji. This transmission rpm ratio results from the quotient of the primary rpm and the secondary rpm which is detected by the sensors 20 and 22. The system 18 can, for example, operate in such a manner that the method sequence results which is explained with respect to FIG. 1 and, for this reason, reference is made to the descriptions to avoid repetition.

Figure 3:
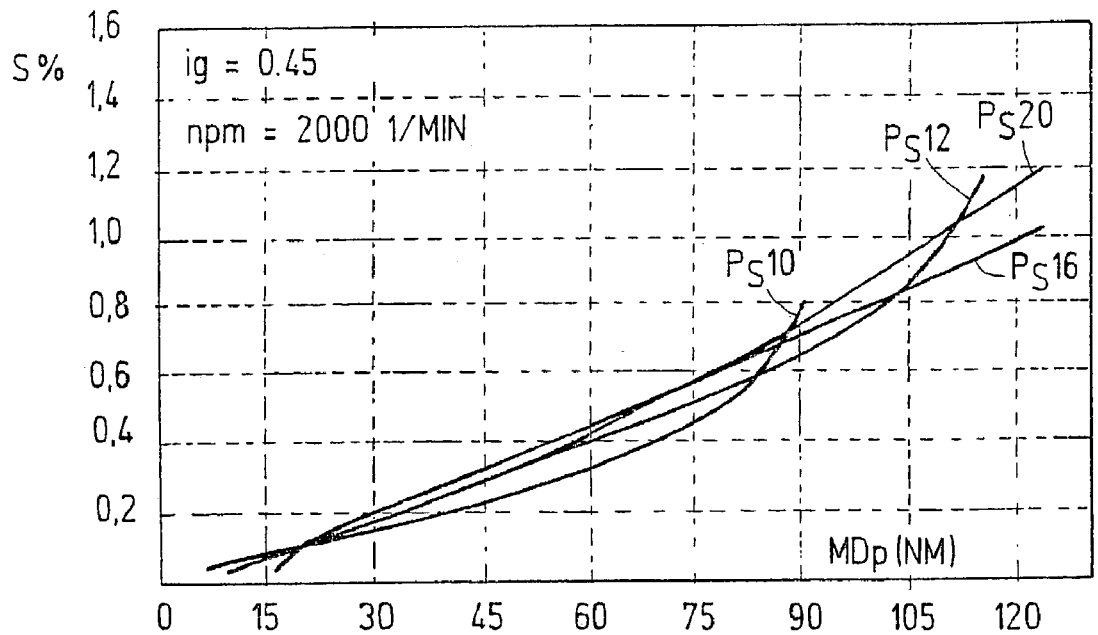
FIG. 3 shows the slip in dependence upon engine torque for a first geometric transmission ratio and a hydraulic contact pressure of 10 bar, 12 bar, 16 bar and 20 bar.

FIG. 3 shows the slip in dependence upon engine torque for a first geometric transmission ratio and a hydraulic contact pressure of 10 bar, 12 bar, 16 bar and 20 bar. The engine torque is plotted in Newton meters on the X-axis while the slip s in percent is plotted on the Y-axis. In the illustration of FIG. 3, a geometric transmission ratio of 0.45 and a primary rpm npm of 2000 1/min is used. The curve $P_S$ 10 shows the trace for a hydraulic contact pressure of 10 bar. Correspondingly, the curve $P_S$ 12 shows the trace for a hydraulic contact pressure of 12 bar, the curve $P_S$ 16 shows the trace for 16 bar and the curve $P_S$ 20 shows the trace for a hydraulic contact pressure of 20 bar. From the illustration of FIG. 3, it can be seen that for a geometric transmission ratio of 0.45, a higher contact force functions only positively at higher engine torques on the slip behavior.

Figure 4:
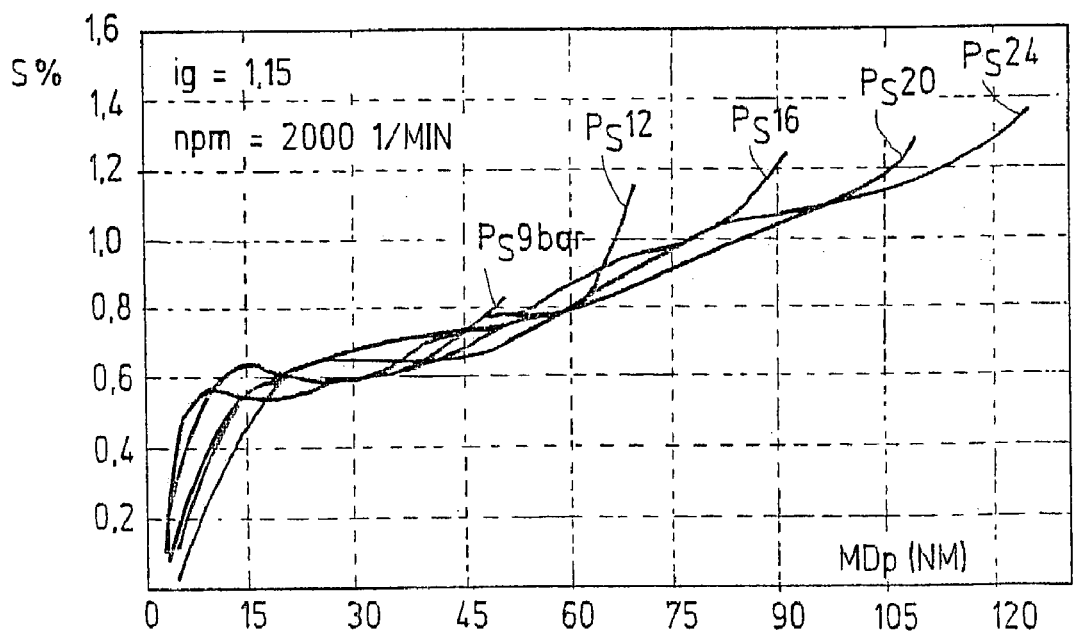
FIG. 4 shows the slip in dependence upon engine torque with a second geometric transmission ratio and a hydraulic contact pressure of 9 bar, 12 bar, 16 bar, 20 bar and 24 bar.

FIG. 4 shows the slip in dependence upon the engine torque for a second geometric transmission ratio and a hydraulic contact pressure of 9 bar, 12 bar, 16 bar, 20 bar and 24 bar. Here, the engine torque is plotted in Newton meters on the X-axis while, on the Y-axis, the slip s is plotted in percent. In the illustration of FIG. 4, a geometric transmission ratio of 1.15 and a primary rpm npm of 2000 1/min were used. The curve $P_S$ 9 shows the trace for a hydraulic contact pressure of 9 bar. Correspondingly, the curve $P_S$ 12 shows the trace for a hydraulic contact pressure of 12 bar, the curve $P_S$ 16 shows the trace for 16 bar, the curve $P_S$ 20 shows the trace for a hydraulic contact pressure of 20 bar and the curve $P_S$ 24 shows the trace for a hydraulic contact pressure of 24 bar. From the illustration of FIG. 4 it can be seen that for a geometric transmission ratio of 1.15 the increase of the contact pressure contributes to hold the slip low starting at an engine torque of approximately 45 Nm.

Figure 5:
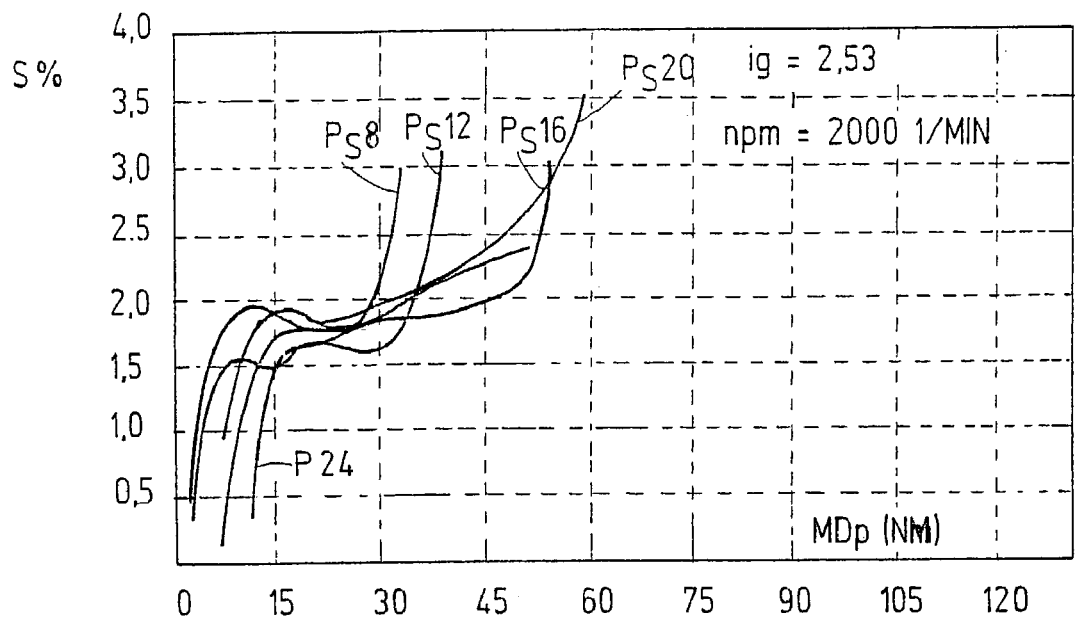
FIG. 5 shows the slip in dependence upon the engine torque for a third geometric transmission ratio and a hydraulic contact pressure of 8 bar, 12 bar, 16 bar, 20 bar and 24 bar; and, FIG. 6 shows an example for the time-dependent trace of the slip and the slip change for an abrupt closing of the forward clutch of a CVT transmission.

FIG. 5 shows the slip in dependence upon engine torque for a third geometric transmission ratio and a hydraulic contact pressure of 8 bar, 12 bar, 16 bar, 20 bar and 24 bar. Here, the engine torque is plotted in Newton meters on the X-axis while the slip s in percent is plotted on the Y-axis. In the illustration of FIG. 5, a geometric transmission ratio of 2.53 and a primary rpm nmp of 2000 1/min were used. The curve $P_S$ 8 shows the trace for a hydraulic contact pressure of 8 bar. Correspondingly, the curve $P_S$ 12 shows the trace for a hydraulic contact pressure of 12 bar, the curve $P_S$ 16 shows the trace for 16 bar, the curve $P_S$ 20 shows the trace for a hydraulic contact pressure of 20 bar and the curve $P_S$ 24 shows the trace for a hydraulic contact pressure of 24 bar. The illustration of FIG. 5 shows that for a geometric transmission ratio of 2.53, one must expect a slip to occur already at significantly lower engine torques. Also, in this case, an increase of the contact pressure can, however, be applied to reduce the slip as can be seen from the illustrated curve traces.

Figure 6:
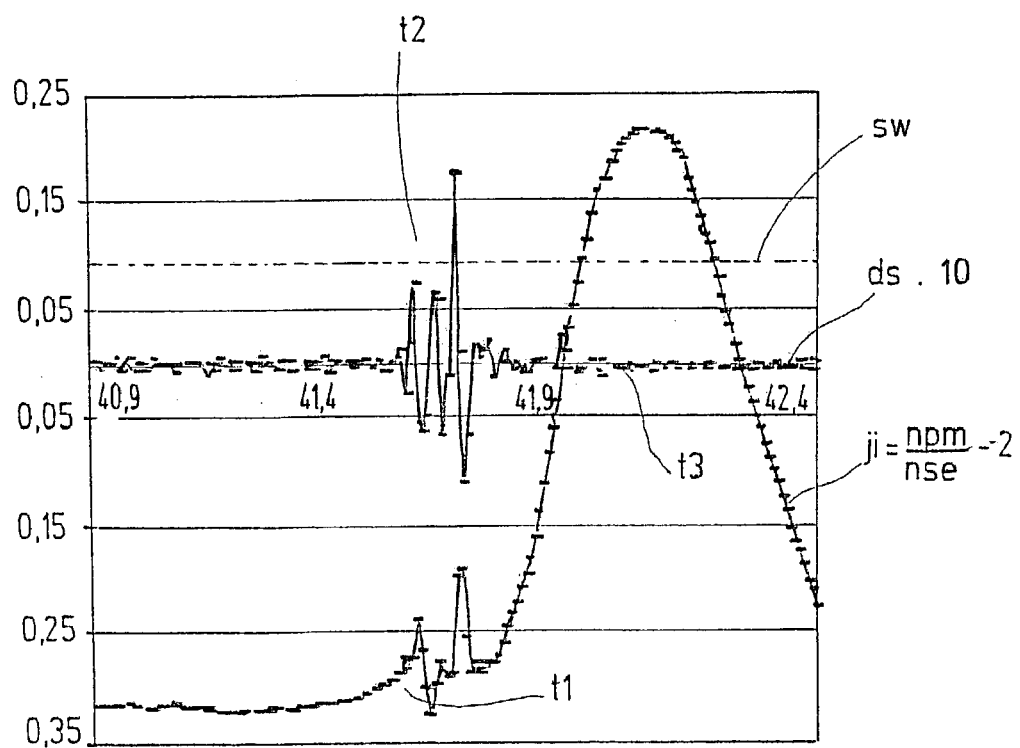

FIG. 6 shows an embodiment for the time-dependent trace of the slip and the slip change when the forward clutch of a CVT transmission is abruptly closed. According to the illustration of FIG. 6, the forward clutch of the CVT transmission is closed at time point t1.

From a comparison of the slip change ds to a threshold value SW, the occurrence of a slip can be detected already at time point t2. At time point t3, the slip change ds is again approximately 0 notwithstanding a rapid transmission ratio shift which is achieved via the use of the compensation term already explained.

The above description of the embodiments according to the present invention serves only illustrative purposes and not the purpose of limiting the invention. In the context of the invention, various changes and modifications are possible without leaving the scope of the invention as well as its equivalents.

The invention claimed is:

1. A method for detecting a slip (s) of a belt part of a belt transmission having first and second rotating parts including a CVT transmission, the method comprising the steps of:
   utilizing a first sensor to detect a first rpm (npm) of said first rotating part;
   utilizing a second sensor to detect a second rpm (nsc) of said second rotating part;
   forming a transmission rpm ratio (ji) from said first rpm (npm) and said second rpm (nsc);
   determining said slip (s) from a change of said transmission rpm ratio (ji); and, estimating the state of wear or deterioration of said belt part from said slip (s) by considering the operating conditions under which said belt part has been operated.

2. The method of claim 1, wherein said evaluation of the transmission rpm ratio (ji) includes distinguishing between relatively slow changes of the transmission rpm ratio (ji) and relatively rapid changes of the transmission rpm ratio (ji).

3. The method of claim 1, comprising the further step of initiating countermeasures with the detection of the slip (s).

4. The method of claim 1, wherein said rotating parts define two conical wheel pairs; and, the belt part runs about said two conical wheel pairs with an adjustable contact pressure; and, the countermeasures include increasing the contact pressure.

5. The method of claim 4, wherein the belt part runs over the two conical wheel pairs with an adjustable contact pressure; and, the contact pressure is adjusted in dependence upon the state of wear of the belt part.

6. A method for detecting a slip (s) of a belt part of a belt transmission having rotating parts defining a transmission rpm ratio (ji), including a CVT transmission, the method comprising the steps of:
utilizing sensors to detect the rpms of the rotating parts defining said transmission rpm ratio (ji);
determining a slip of the belt part from a change of the transmission rpm ratio (ji), wherein a slip change (ds) is determined as follows:

$$ds(n)=([ji(n+1)-ji(n)]-K)/N,$$

wherein: ds is the slip change, n is an index or a computing raster; ji is the transmission rpm ratio; K is a compensation term; and, N is a normalization term.

7. The method of claim 6, wherein the compensation term (K) is provided for compensating relatively slow changes of the transmission rpm ratio (ji).

8. The method of claim 6, wherein the compensation term (K) is determined via a median value formation.

9. The method of claim 6, wherein the compensation term (K) is determined via a mean value formation.

10. The method of claim 6, wherein the compensation term (K) is determined as follows:

$$K=[ji(n+4)-ji(n-4)]/8,$$

wherein: K is the compensation term; ji is the transmission rpm ratio; and, n is an index or a computing raster.

11. The method of claim 6, wherein the normalization term (N) is provided for adapting the slip change (ds) to different rpm ranges.

12. The method of claim 6, wherein the normalization term (N) is determined as follows:

$$N=[ji(n)]^3,$$

wherein: N is the normalization term; ji is the transmission rpm ratio; and, n is an index or a computing raster.

13. A system for detecting a slip (s) of a belt part of a belt transmission having first and second rotating parts, including of a CVT transmission, the system comprising:
a first sensor for detecting a first rpm (npm) of said first rotating part; a second sensor for detecting a second rpm (nsc) of said second rotating part;
means for forming a transmission ratio (ji) from said first rpm (npm) and said second rpm (nsc);
means for determining a slip (s) of the belt part from a change of the transmission rpm ratio (ji); and,
means for calculating the state of wear or deterioration of the belt part from the detected slip (s) by considering the operating conditions under which said belt part has been operated.

14. The system of claim 13, further comprising means for distinguishing between relatively slow changes of the transmission rpm ratio (ji) and relatively rapid changes of the transmission rpm ratio (ji) in the evaluation of the transmission rpm ratio (ji).

15. The system of claim 13, further comprising means for initiating countermeasures with the detection of a slip (s).

16. The system of claim 13, wherein the belt part runs over two conical wheel pairs with an adjustable contact pressure; and, the countermeasures include increasing the contact pressure.

17. The system of claim 13, wherein the belt part runs over two conical wheel pairs with an adjustable contact pressure; and, the system adjusts the contact pressure in dependence upon the state of wear of the belt part.

18. A system for detecting a slip (s) of a belt part of a belt transmission having rotating parts defining a transmission rpm ratio (ji) including of a CVT transmission, the system comprising:
means for sensing the rpms of the rotating parts defining said transmission rpm ratio (ji);
means for determining a slip of the belt part from a change of the transmission rpm ratio (ji), wherein the system detects a slip change (ds) as follows:

$$ds(n)=([ji(n-1)-ji(n)]-K)/N,$$

wherein: ds is the slip change; n is an index or a computing raster; ji is the transmission rpm ratio; K is a compensation term; and, N is a normalization term.

19. The system of claim 18, wherein the system uses the compensation term (K) for compensating relatively slow changes of the transmission rpm ratio (ji).

20. The system of claim 18, wherein the system determines the compensation term (K) via a median value formation.

21. The system of claim 18, wherein the system determines the compensation term (K) via a mean value formation.

22. A system for detecting a slip (s) of a belt part of a belt transmission having rotating parts defining a transmission rpm ratio (ji) including of a CVT transmission, the system comprising:
means for sensing the rpms of the rotating parts defining said transmission rpm ratio (ji);
means for determining a slip of the belt part from a change of the transmission rpm ratio (ji), wherein the system determines the compensation term (K) as follows:

$$K=[ji(n4)-ji(n4)]/8,$$

wherein: K is the compensation term; ji is the transmission rpm ratio; and, n is an index or a computing raster.

23. The system of claim 22, wherein the system uses the normalization term (N) for adapting the slip change (ds) to different rpm ranges.

24. The system of claim 23, wherein the system determines the normalization term (N) as follows:

$$N=[ji(n)]^3,$$

wherein: N is the normalization term; ji is the transmission rpm ratio; and, n is an index or a computing raster.

25. A method for detecting a slip (s) of a belt part of a belt transmission having rotating parts defining a transmission rpm ratio (ji), including a CVT transmission, the method comprising the steps of:
- utilizing sensors to detect the rpms of the rotating parts defining said transmission rpm ratio (ji);
- determining said slip (s) from a change of said transmission rpm ratio (ji);
- estimating the state of wear of said belt part from said slip (s); and,
- wherein the slip (s) is defined as follows:

$$s=1\ (ig/ji),$$

wherein: s is the slip; ig is a geometric transmission ratio; and, ji is the transmission rpm ratio.

26. The method of claim 25, wherein the geometric transmission ratio is assumed as a constant value (c).

27. The method of claim 25, wherein the geometric transmission ratio (ig) is set to the maximum value of the geometric transmission ratio (igmax) when the state "maximum transmission ratio" is detected.

28. The method of claim 25, wherein the geometric transmission ratio (ig) is set to the minimum value of the geometric transmission ratio (igmin) when the state "minimum transmission ratio" is detected.

29. The method of claim 25, wherein the slip detection essentially takes place only in the state "maximum transmission ratio".

30. The method of claim 25, wherein the slip detection essentially takes place only in the state "minimum transmission ratio".

31. A method for detecting a slip (s) of a belt part of a belt transmission having rotating parts defining a transmission rpm ratio (ji), including a CVT transmission, the method comprising the steps of:
- utilizing sensors to detect the rpms of the rotating parts defining said transmission rpm ratio (ji);
- determining said slip (s) from a chance of said transmission rpm ratio (ji);
- estimating the state of wear of said belt part from said slip (s); and,
- wherein a slip change (ds) is determined as follows:

$$ds(n)=([ji(n1)-ji(n)]-K)/N,$$

wherein: ds is the slip change, n is an index or a computing raster; ji is the transmission rpm ratio; K is a compensation term; and, N is a normalization term.

32. The method of claim 31, wherein the compensation term (K) is provided for compensating relatively slow changes of the transmission rpm ratio (ji).

33. The method of claim 31, wherein the compensation term (K) is determined via a median value formation.

34. The method of claim 31, wherein the compensation term (K) is determined via a mean value formation.

35. The method of claim 31, wherein the compensation term (K) is determined as follows:

$$K=[ji(n4)-ji(n4)]/8,$$

wherein: K is the compensation term; ji is the transmission rpm ratio; and, n is an index or a computing raster.

36. The method of claim 31, wherein the normalization term (N) is provided for adapting the slip change (ds) to different rpm ranges.

37. The method of claim 31, wherein the normalization term (N) is determined as follows:

$$N=[ji(n)]^3,$$

wherein: N is the normalization term; ji is the transmission rpm ratio; and, n is an index or a computing raster.

38. A system for detecting a slip (s) of a belt part of a belt transmission having rotating parts defining a transmission rpm ratio (ji) including of a CVT transmission, the system comprising:
- means for sensing the rpms of the rotating parts defining said transmission rpm ratio (ji);
- means for determining a slip (s) of the belt part from a chance of the transmission rpm ratio (ji);
- means for calculating the state of wear of the belt part from the detected slip (s); and,
- wherein the slip (s) is defined as follows:

$$s=1-(ig/ji),$$

wherein: s is the slip; ig is a geometric transmission ratio; and, ji is the transmission rpm ratio.

39. The system of claim 38, wherein the system assumes the geometric transmission ratio as a constant value (c).

40. The system of claim 38, wherein the geometric transmission ratio (ig) is set to the maximum value of the geometric transmission ratio (igmax) when the state "maximum transmission ratio" is detected.

41. The system of claim 38, wherein the geometric transmission ratio (ig) is set to the minimum value of the geometric transmission ratio (igmin) when the state "minimum transmission ratio" is detected.

42. The system of claim 38, wherein the slip detection essentially takes place only in the state "maximum transmission ratio".

43. The system of claim 38, wherein the slip detection essentially takes place only in the state "minimum transmission ratio".

44. A system for detecting a slip (s) of a belt part of a belt transmission having rotating parts defining a transmission rpm ratio (ji) including of a CVT transmission, the system comprising:
- means for sensing the rpms of the rotating parts defining said transmission rpm ratio (ji);
- means for determining a slip (s) of the belt part from a change of the transmission rpm ratio (ji);
- means for calculating the state of wear of the belt part from the detected slip (s); and,
- wherein the system detects a slip change (ds) as follows:

$$ds(n)=([ji(n+1)-ji(n)]-K)/N,$$

wherein: ds is the slip change; n is an index or a computing raster; ji is the transmission rpm ratio; K is a compensation term; and, N is a normalization term.

45. The system of claim 44, wherein the system uses the compensation term (K) for compensating relatively slow changes of the transmission rpm ratio (ji).

46. The system of claim 44, wherein the system determines the compensation term (K) via a median value formation.

47. The system of claim 44, wherein the system determines the compensation term (K) via a mean value formation.

48. A system for detecting a slip (s) of a belt part of a belt transmission having rotating parts defining a transmission rpm ratio (ji) including of a CVT transmission, the system comprising:

means for sensing the rpms of the rotating parts defining said transmission rpm ratio (ji);

means for determining a slip (s) of the belt part from a change of the transmission rpm ratio (ji);

means for calculating the state of wear of the belt part from the detected slip (s); and, wherein the system determines the compensation term (K) as follows:

$$K=[ji(n+4)-ji(n-4)]/8,$$

wherein: K is the compensation term; ji is the transmission rpm ratio; and, n is an index or a computing raster.

49. The system of claim 48, wherein the system uses the normalization term (N) for adapting the slip change (ds) to different rpm ranges.

50. The system of claim 49, wherein the system determines the normalization term (N) as follows:

$$N=[ji(n)]^3,$$

wherein: N is the normalization term; ji is the transmission rpm ratio; and, n is an index or a computing raster.

* * * * *

UNITED STATES PATENT AND TRADEMARK OFFICE
CERTIFICATE OF CORRECTION

PATENT NO. : 7,174,245 B2  Page 1 of 1
APPLICATION NO. : 10/362541
DATED : February 6, 2007
INVENTOR(S) : Klaus Ries-Mueller and Joachim Luh It is certified that error appears in the above-identified patent and that said Letters Patent is hereby corrected as shown below:

In column 12:
Line 31: Delete "ds (n) = ( [ ji (n-1) - ji (n) ] -K) /N," and substitute -- ds (n) = ( [ji (n+1) -ji (n) ] -K) /N, -- therefor.
Line 55: Delete "K= [ji (n4) - ji (n4) ] /8," and substitute -- K= [ji (n+4) -ji (n-4) ] /8, -- therefor.

In column 13:
Line 14: Delete "s=1 (ig/ji)," and substitute -- s=1- (ig/ji), -- therefor.
Line 40: Delete "chance" and substitute -- change -- therefor.
Line 46: Delete "ds (n) = ( [ ji (n1) - ji (n) ] -K) /N," and substitute -- ds (n) = ( [ji (n+1) -ji (n) ] -K) /N, -- therefor.
Line 61: Delete "K= [ji (n4) - ji (n4) ] /8," and substitute -- K= [ji (n+4) -ji (n-4) ] /8, -- therefor.

In column 14:
Line 14: Delete "chance" and substitute -- change -- therefor.

Signed and Sealed this

Third Day of July, 2007

JON W. DUDAS
*Director of the United States Patent and Trademark Office*